(12) United States Patent
Im et al.

(10) Patent No.: US 10,811,699 B2
(45) Date of Patent: Oct. 20, 2020

(54) SOLID OXIDE FUEL CELL WITH ELECTRIC CONDUCTIVE PATTERNS ON ANODE AND CATHODE

(71) Applicant: LG CHEM, LTD., Seoul (KR)

(72) Inventors: Sanghyeok Im, Daejeon (KR); Kwangwook Choi, Daejeon (KR); Jeong Mi Choi, Daejeon (KR); Yeonhyuk Heo, Daejeon (KR); Tai Min Noh, Daejeon (KR); Kwangyeon Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 99 days.

(21) Appl. No.: 16/099,475

(22) PCT Filed: Aug. 24, 2017

(86) PCT No.: PCT/KR2017/009259
§ 371 (c)(1),
(2) Date: Nov. 7, 2018

(87) PCT Pub. No.: WO2018/062692
PCT Pub. Date: Apr. 5, 2018

(65) Prior Publication Data
US 2019/0221860 A1  Jul. 18, 2019

(30) Foreign Application Priority Data

Sep. 28, 2016 (KR) .......................... 10-2016-0124808

(51) Int. Cl.
*H01M 8/026* (2016.01)
*H01M 8/0202* (2016.01)
(Continued)

(52) U.S. Cl.
CPC ......... *H01M 8/026* (2013.01); *H01M 8/0202* (2013.01); *H01M 8/0258* (2013.01);
(Continued)

(58) Field of Classification Search
CPC .. H01M 8/026; H01M 8/0202; H01M 8/0258; H01M 8/124; H01M 8/0269; H01M 2008/1293; Y02E 60/525
(Continued)

(56) References Cited

U.S. PATENT DOCUMENTS 7,947,386 B2  5/2011  Chung et al.
9,496,574 B2  11/2016  Iritsuki et al.
(Continued)

FOREIGN PATENT DOCUMENTS

DE   10 2006 045 086 A1   3/2007
JP   2004-311074 A        11/2004
(Continued)

OTHER PUBLICATIONS

International Search Report (PCT/ISA/210) issued in PCT/KR2017/009259, dated Nov. 30, 2017.
(Continued)

*Primary Examiner* — Gary D Harris
(74) *Attorney, Agent, or Firm* — Birch, Stewart, Kolasch & Birch, LLP (57) ABSTRACT

A solid oxide fuel cell is provided that includes an an anode, a cathode, and an electrolyte provided between the anode and the cathode.

10 Claims, 8 Drawing Sheets (51) Int. Cl.
*H01M 8/124* (2016.01)
*H01M 8/0258* (2016.01)

(52) U.S. Cl.
CPC ......... *H01M 8/0269* (2013.01); *H01M 8/124* (2013.01); *H01M 2008/1293* (2013.01)

(58) Field of Classification Search
USPC ........................................................ 429/457
See application file for complete search history.

(56) References Cited

U.S. PATENT DOCUMENTS

| | | | |
|---|---|---|---|
| 2003/0082434 A1* | 5/2003 | Wang | H01M 8/0256 |
| | | | 429/469 |
| 2004/0214072 A1 | 10/2004 | Miura et al. | |
| 2006/0257703 A1 | 11/2006 | Qi et al. | |
| 2007/0072046 A1 | 3/2007 | Thompson et al. | |
| 2009/0297906 A1 | 12/2009 | Harada | |
| 2009/0317673 A1 | 12/2009 | Cha et al. | |
| 2010/0062302 A1 | 3/2010 | Bae et al. | |
| 2014/0178797 A1 | 6/2014 | Yoon et al. | |
| 2017/0237103 A1 | 8/2017 | Choi et al. | |

FOREIGN PATENT DOCUMENTS

| | | | |
|---|---|---|---|
| JP | 2007-227080 | A | 9/2007 |
| JP | 2008-123842 | A | 5/2008 |
| JP | 2010-15977 | A | 1/2010 |
| JP | 2010-192169 | A | 9/2010 |
| JP | 5117821 | B2 | 1/2013 |
| JP | 2013-84421 | A | 5/2013 |
| JP | 5907441 | B2 | 4/2016 |
| KR | 10-0727684 | B1 | 6/2007 |
| KR | 10-2010-0029333 | A | 3/2010 |
| KR | 10-1161991 | B1 | 7/2012 |
| KR | 10-1454081 | B1 | 10/2014 |
| KR | 10-2016-0059419 | A | 5/2016 |
| KR | 10-2016-0077332 | A | 7/2016 |

OTHER PUBLICATIONS

Extended European Search Report for European Application No. 17856578.4, dated Apr. 15, 2019.

* cited by examiner

SOLID OXIDE FUEL CELL WITH ELECTRIC CONDUCTIVE PATTERNS ON ANODE AND CATHODE

TECHNICAL FIELD

This application claims priority to and the benefit of Korean Patent Application No. 10-2016-0124808 filed in the Korean Intellectual Property Office on Sep. 28, 2016, the entire contents of which are incorporated herein by reference.

The present specification relates to a solid oxide fuel cell including an anode, a cathode, and an electrolyte provided between the anode and the cathode.

BACKGROUND ART

Recently, depletion of existing energy sources such as oil and coal has been predicted, and interest in energy that can replace the energy is increasing. A fuel cell as one of the alternative energy has particularly received attention due to high efficiency and merits such that pollutants such as NOx and SOx are not discharged and the used fuel is abundant.

The fuel cell is a power generation system that converts chemical reaction energy of the fuel and an oxidizer into electric energy, and hydrogen and hydrocarbons such as methanol and butane as the fuel and oxygen as the oxidizer are representatively used.

The fuel cell includes a polymer electrolyte membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SOFC), and the like.

Meanwhile, research on a metal air secondary battery that manufactures a cathode of the metal secondary battery as an air electrode by applying a principle of the air electrode of the fuel cell is required.

DETAILED DESCRIPTION OF THE INVENTION

Technical Problem

The present specification has been made in an effort to provide a solid oxide fuel cell including an anode, a cathode, and an electrolyte provided between the anode and the cathode.

Technical Solution

An exemplary embodiment of the present specification provides a solid oxide fuel cell including: a battery cell including a cathode, an anode, and an electrolyte layer provided between the cathode and the anode; a first separator positioned on an opposite surface to the surface of the cathode with the electrolyte layer and provided with a flow channel pattern having a groove pattern and a protrusion pattern, to which air is supplied; a second separator positioned on an opposite surface to the surface of the anode with the electrolyte layer and provided with a flow channel pattern having a groove pattern and a protrusion pattern, to which fuel is supplied; and an electric conductive pattern provided on the surface of the anode facing the second separator along the groove pattern of the second separator, in which the electric conductive pattern is inserted to the groove pattern of the second separator.

Another exemplary embodiment of the present specification provides a battery module including the solid oxide fuel cell as a unit cell.

Advantageous Effects

According to the present specification, the fuel cell has an advantage of a small current resistance of a battery cell and a separator.

The fuel cell of the present specification has an advantage of good battery performance.

EXPLANATION OF REFERENCE NUMERALS AND SYMBOLS

60: Battery module
70: Oxidizer supply unit
80: Fuel supply unit
81: Fuel tank
82: Pump
100: Battery cell
200: First separator
210: Groove pattern of first separator
230: Protrusion pattern of first separator
250: Flow channel pattern of first separator
300: Second separator
310: Groove pattern of second separator
330: Protrusion pattern of second separator
350: Flow channel pattern of second separator
400: Electric conductive pattern
500: Anode current collector
600: Cathode current collector
700: Additional electric conductive pattern

BEST MODE

Hereinafter, the present specification will be described in detail.

The present specification provides a solid oxide fuel cell including: a battery cell including a cathode, an anode, and an electrolyte layer provided between the cathode and the anode; a first separator positioned on an opposite surface to the surface of the cathode with the electrolyte layer and provided with a flow channel pattern having a groove pattern and a protrusion pattern, to which air is supplied; a second separator positioned on an opposite surface to the surface of the anode with the electrolyte layer and provided with a flow channel pattern having a groove pattern and a protrusion pattern, to which fuel is supplied; and an electric conductive pattern provided on the surface of the anode facing the second separator along the groove pattern of the second separator, in which the electric conductive pattern is inserted to the groove pattern of the second separator.

Figure 4:
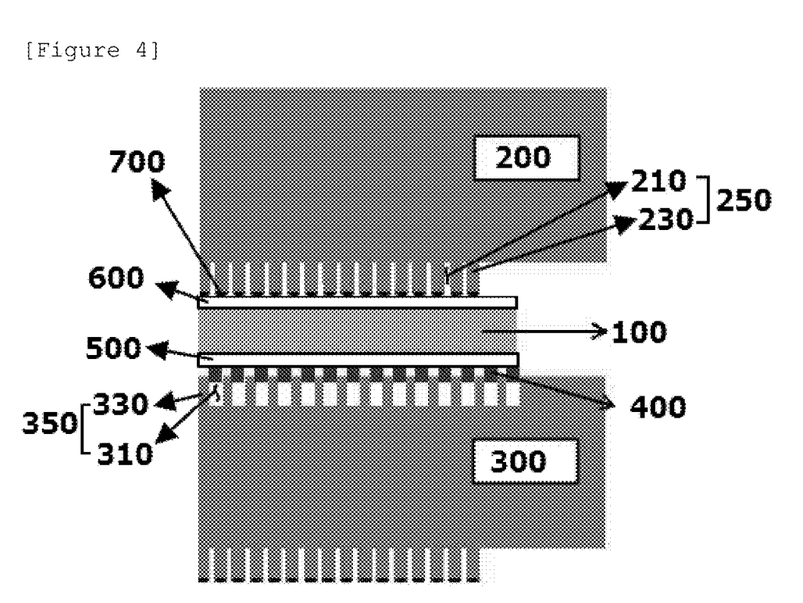
FIG. 4 is a vertical cross-sectional view of a solid oxide fuel cell according to a first exemplary embodiment of the present specification.

According to FIG. 4, the present specification provides a solid oxide fuel cell including: a battery cell 100 including a cathode, an anode, and an electrolyte layer provided between the cathode and the anode; a first separator 200 positioned on an opposite surface to the surface of the cathode with the electrolyte layer and provided with a flow channel pattern 250 having a groove pattern 210 and a protrusion pattern 230, to which air is supplied; a second separator 300 positioned on an opposite surface to the surface of the anode with the electrolyte layer and provided with a flow channel pattern 350 having a groove pattern 310 and a protrusion pattern 330, to which fuel is supplied; and an electric conductive pattern 400 provided on the surface of the anode facing the second separator along the groove pattern of the second separator, in which the electric conductive pattern is inserted to the groove pattern of the second separator.

The solid oxide fuel cell further includes an anode current collector provided between the anode and the second separator, in which the electric conductive pattern may be formed on the surface of the anode current collector facing the second separator.

According to FIG. 4, the solid oxide fuel cell further includes an anode current collector 500 provided between the anode and the second separator 300, in which the electric conductive pattern 400 may be formed on the surface of the anode current collector 500 facing the second separator.

Figure 8:
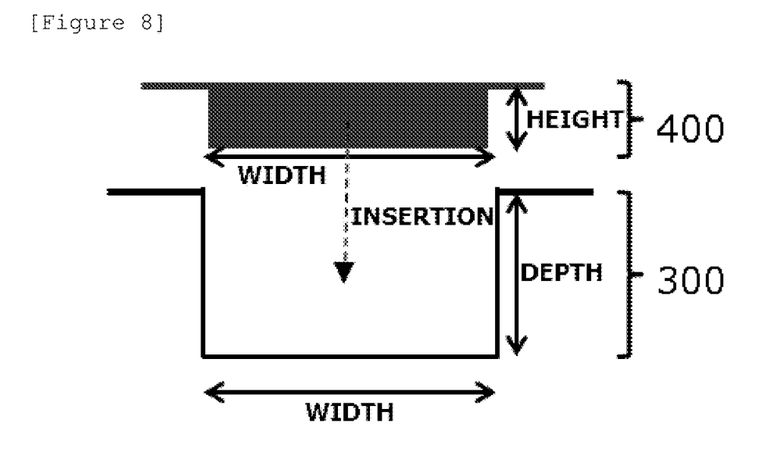
FIG. 8 is a coupled cross-section view illustrating that an electric conductive pattern is inserted to a groove pattern of a second separator according to an exemplary embodiment of the present invention.

The average line width of the groove pattern of the second separator may be equal to or smaller than the average line width of the electric conductive pattern. Herein, a width of the groove pattern 310 of the second separator 300 and a width of the electric conductive pattern 400 are the same as those illustrated in FIG. 8.

The porosity of the electric conductive pattern may be 30% or more. The electric conductive pattern may be prepared with a paste containing a pore-forming agent such as carbon and have a porosity of 30% or more.

An average height of the electric conductive pattern may be equal to or smaller than a half of the average depth of the groove pattern of the second separator. Herein, a depth of the groove pattern 310 of the second separator 300 and a height of the electric conductive pattern 400 are the same as those illustrated in FIG. 8.

The electric conductivity of the electric conductive pattern may be higher than that of the anode to be contacted, and particularly, the electric conductivity of the electric conductive pattern may be 400 S/cm or more. The higher the electric conductivity of the electric conductive pattern is, the better it is, and as a result, the upper limit of the electric conductivity of the electric conductive pattern is not limited.

The electric conductive pattern may include nickel or nickel oxide (NiO).

The solid oxide fuel cell may further include a cathode current collector provided between the cathode and the first separator. Referring to FIG. 4, the solid oxide fuel cell may further include a cathode current collector 600 provided between the cathode and the first separator 200.

The solid oxide fuel cell may further include an additional electric conductive pattern formed on a surface of the cathode facing the first separator along the protrusion pattern of the first separator, in which the additional electric conductive pattern may contact the end of the protrusion pattern of the first separator.

According to FIG. 4, the solid oxide fuel cell may further include an additional electric conductive pattern 700 formed on a surface of the cathode facing the first separator 200 along the protrusion pattern 230 of the first separator 200, in which the additional electric conductive pattern 700 may contact the end of the protrusion pattern 230 of the first separator 200.

The solid oxide fuel cell may further include an additional electric conductive pattern formed on a surface of the cathode facing the first separator along the groove pattern of the first separator, in which the additional electric conductive pattern may be inserted to the groove pattern of the first separator.

Figure 5:
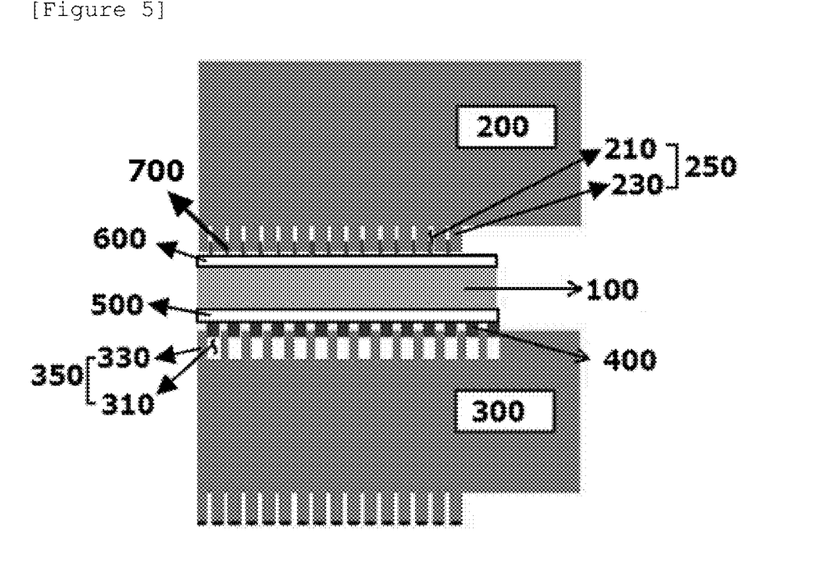
FIG. 5 is a vertical cross-sectional view of a solid oxide fuel cell according to a second exemplary embodiment of the present specification.

According to FIG. 5, the solid oxide fuel cell may further include an additional electric conductive pattern 700 formed on a surface of the cathode facing the first separator 200 along the groove pattern 210 of the first separator 200, in which the additional electric conductive pattern 700 may be inserted to the groove pattern 210 of the first separator 200.

The additional electric conductive pattern may include lanthanum strontium cobalt oxide (LSC).

The form of the fuel cell is not limited, and for example, may be a coin type, a plate type, a cylinder type, a horn type, a button type, a sheet type, or a stacked type.

The fuel cell may be particularly used as power of an electric vehicle, a hybrid electric vehicle, a plug-in hybrid electric vehicle or an electric power storage device.

The present specification provides a battery module including the solid oxide fuel cell as a unit cell.

Figure 1:
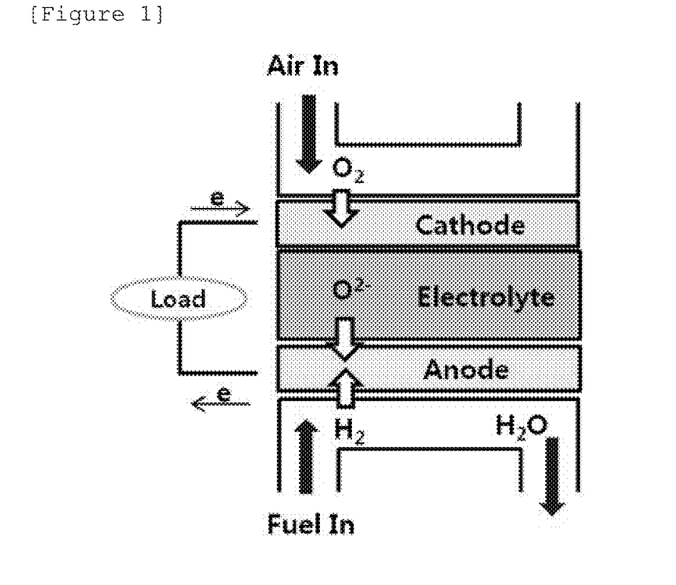
FIG. 1 is a schematic diagram illustrating an electricity generation principle of a solid oxide type fuel cell.
Figure 2:
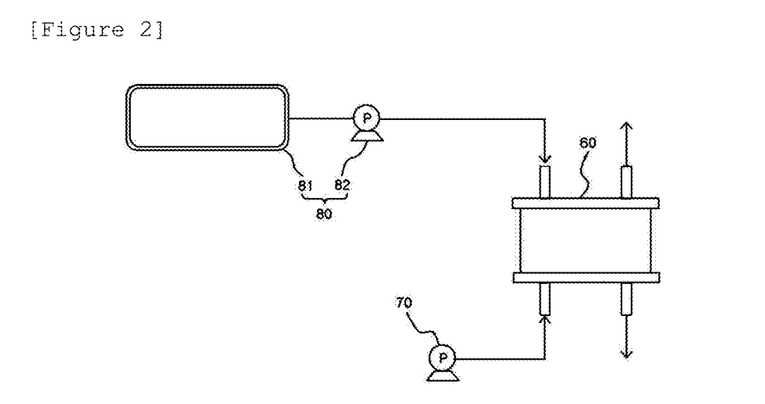
FIG. 2 is a diagram schematically illustrating an Example of a battery module including a fuel cell.
Figure 3:
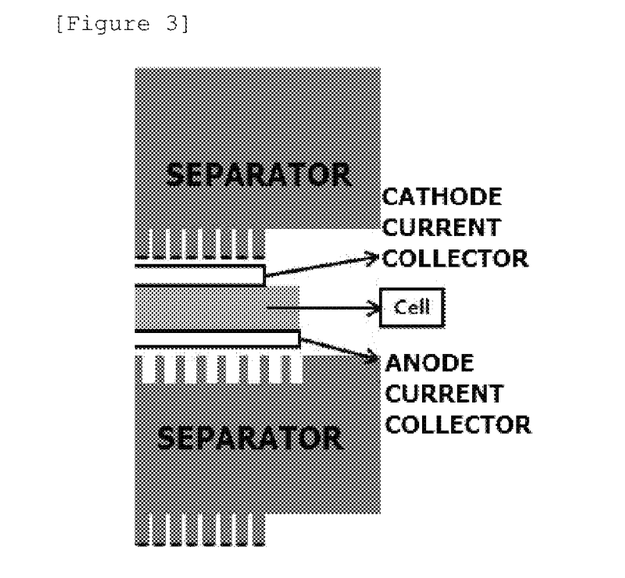
FIG. 3 is a vertical cross-sectional view of a solid oxide fuel cell in a Comparative Example.

FIG. 2 schematically illustrates an embodiment of a battery module including a fuel cell, and the fuel cell includes a battery module 60, an oxidizer supply unit 70, and a fuel supply unit 80.

The battery module 60 includes one or more fuel cells described above as unit cells, and when two or more unit cells are included, separators interposed between the unit cells are included. The separator serves to prevent the unit cells from being electrically connected to each other and transmit the fuel and the oxidizer supplied from the outside to the unit cells.

The oxidizer supply unit 70 serves to supply the oxidizer to the battery module 60. As the oxidizer, oxygen is representatively used, and oxygen or air which is injected into the oxidizer supply unit 70 may be used.

The fuel supply unit 80 serves to supply the fuel to the battery module 60 and may include a fuel tank 81 storing the fuel and a pump 82 supplying the fuel stored in the fuel tank 81 to the battery module 60. As the fuel, gas or liquid hydrogen or hydrocarbon fuel may be used. Examples of the hydrocarbon fuel may include methanol, ethanol, propanol, butanol or natural gas.

Hereinafter, the present specification will be described in more detail through Examples. However, the following Examples are just to exemplify the present specification and the present specification is not limited thereto.

EXAMPLE

A solid oxide fuel cell used for measurement was prepared by an anode support layer (ASL), a cathode functional layer (AFL), an electrolyte layer (EL), and a cathode layer (CL).

ASL slurry used GDC, NiO and carbon black as an inorganic material, and in this case, a ratio of GDC and NiO was 50:50 vol % and the content of carbon black was 10 wt % based on the entire weight of the slurry.

Further, the ASL slurry included a dispersant, a plasticizer, and a binder resin together with a solvent and was added with 18.2 wt % of the solvent, 6.2 wt % of the dispersant, 1.2 wt % of the plasticizer and 24.2 wt % of the binder based on the entire weight of the slurry. The ASL slurry was tape-cast to obtain an ASL green sheet having a thickness of 100 μm to 200 μm.

AFL slurry had the same organic material as the ASL slurry except for the inorganic material, but a composition ratio of GDC and NiO was 60:40 vol %, and carbon black was not included, and an AFL green sheet having a thickness of 10 μm thinner than that of the ASL was cast using the AFL slurry.

EL slurry had the same organic material as the ASL slurry except for the inorganic material, but the inorganic material was made of GDC alone without NiO and carbon black, and an EL green sheet having a thickness of 20 μm was cast using the EL slurry.

The ASL green sheet, the AFL green sheet and the EL green sheet were sequentially laminated and sintered at 1400° C. to prepare a half cell. In this case, thicknesses of the ASL, the AFL, and the EL after sintering were 800 μm, 20 μm, and 20 μm, respectively.

An LSCF cathode composition containing 60 wt % of LSCF6428 ($La_{0.6}Sr_{0.4}Co_{0.2}Fe_{0.8}O_{3-\delta}$) and 40 wt % of ESL441 as a binder composition based on the total weight of the entire composition was prepared in a form of paste using a three roll mill.

The LSCF cathode composition was coated on the electrolyte layer of the above-prepared half cell by screen printing, dried, and then heat-treated at 1000° C. to form a cathode.

Figure 7:
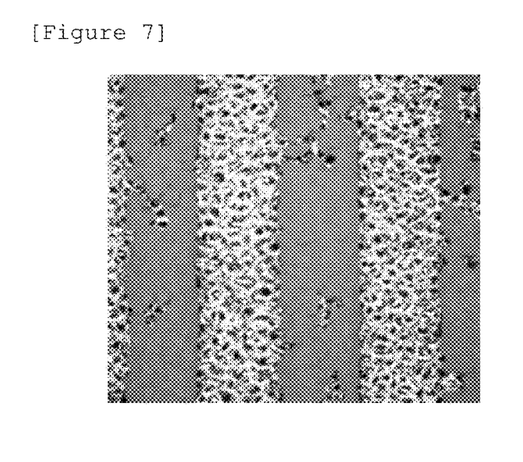
FIG. 7 is an SEM image for a surface of a nickel foam which is an anode current collector in an Example.

After a nickel foam as an anode current collector to be attached to the prepared fuel cell was fixed to the cell using a bonding agent, the prepared NiO paste (65% of NiO and 60% of ESL441 binder composition) was coated as patterns having a width of 1.3 mm and a height of 0.5 mm by dispensing and then dried at 120° C. for 2 hours or more. The pattern was symmetrical with a groove pattern of a separator. At this time, the NiO pattern formed on the nickel foam as the anode current collector was measured by a scanning electron microscope (SEM) and illustrated in FIG. 7.

A silver mesh pattern as a cathode current collector was formed at the cathode side of the prepared fuel cell, and as illustrated in FIG. 4, an additional electric conductive pattern formed in the LSC paste provided at the end of the protrusion pattern of a separator, which was in contact with the cathode side, was used.

COMPARATIVE EXAMPLE

A solid oxide fuel cell used for measurement was prepared by an anode support layer (ASL), a cathode functional layer (AFL), an electrolyte layer (EL), and a cathode layer (CL).

ASL slurry used GDC, NiO and carbon black as an inorganic material, and in this case, a ratio of GDC and NiO was 50:50 vol % and the content of carbon black was 10 wt % based on the entire weight of the slurry.

Further, the ASL slurry included a dispersant, a plasticizer, and a binder resin together with a solvent and was added with 18.2 wt % of the solvent, 6.2 wt % of the dispersant, 1.2 wt % of the plasticizer and 24.2 wt % of the binder based on the entire weight of the slurry. The ASL slurry was tape-cast to obtain an ASL green sheet having a thickness of 100 μm to 200 μm.

AFL slurry had the same organic material as the ASL slurry except for the inorganic material, but a composition ratio of GDC and NiO was 60:40 vol %, and carbon black was not included, and an AFL green sheet having a thickness of 10 μm thinner than that of the ASL was cast using the AFL slurry.

EL slurry had the same organic material as the ASL slurry except for the inorganic material, but the inorganic material was made of GDC alone without NiO and carbon black, and an EL green sheet having a thickness of 20 μm was cast using the EL slurry.

The ASL green sheet, the AFL green sheet and the EL green sheet were sequentially laminated and then sintered at 1400° C. to prepare a half cell. In this case, thicknesses of the ASL, the AFL, and the EL after sintering were 800 μm, 20 μm, and 20 μm, respectively.

An LSCF cathode composition containing 60 wt % of LSCF6428 ($La_{0.6}Sr_{0.4}Co_{0.2}Fe_{0.8}O_{3-\delta}$) and 40 wt % pf ESL441 as a binder composition based on the total weight of the entire composition was prepared in a form of paste using a three roll mill.

The LSCF cathode composition was coated on the electrolyte layer of the above-prepared half cell by a screen printing method, dried, and then heat-treated at 1000° C. to form a cathode.

A nickel foam as an anode current collector to be attached to the prepared fuel cell was fixed to the cell using a bonding agent.

Figure 6:
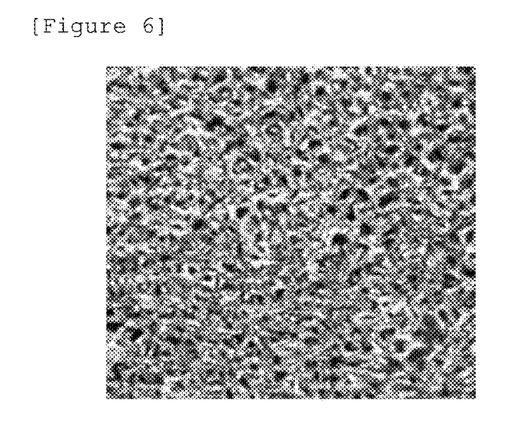
FIG. 6 is a scanning electron microscope (SEM) image for a surface of a nickel foam which an anode current collector in a Comparative Example.

At this time, the nickel foam without the NiO pattern was measured by the SEM and illustrated in FIG. 6.

A silver mesh pattern as a cathode current collector was formed at the cathode side of the prepared fuel cell, and as illustrated in FIG. 4, an additional electric conductive pattern formed in the LSC paste provided at the end of the protrusion pattern of a separator, which was in contact with the cathode side, was used.

EXPERIMENTAL EXAMPLE 1

Figure 9:
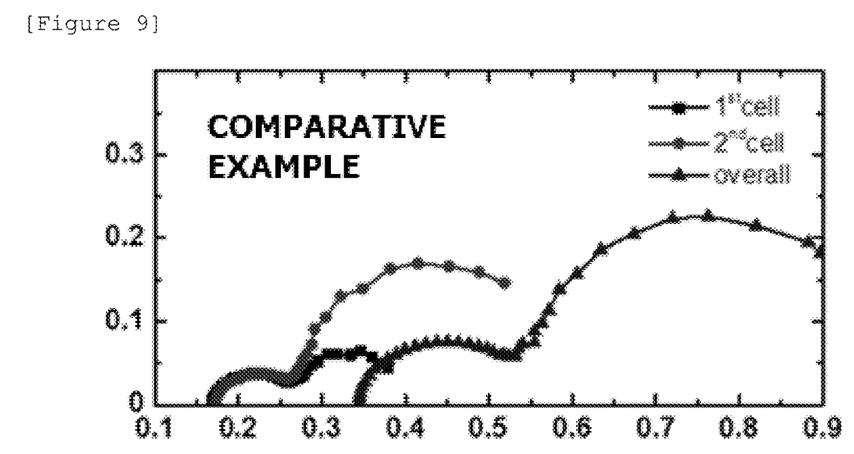
FIG. 9 is a graph illustrating sheet resistance measurement results in a Comparative Example.
Figure 10:
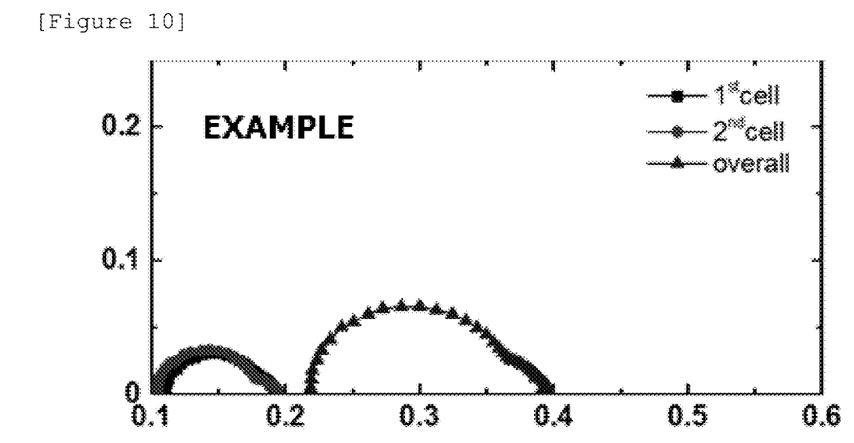
FIG. 10 is a graph illustrating sheet resistance measurement results in an Example.

The sheet resistance was measured by using a 4prove 2wire method after connecting an inconel wire to each electrode of the fuel cell and connecting a sheet resistance measuring device located outside an electric furnace device. In this case, the used measuring device was solartron 1287 and 1260. The results were illustrated in FIG. 9 (Comparative Example), FIG. 10 (Example), and Table 1 below.

As a result, in the Example and the Comparative Example, it can be seen that since all parameters are the same as each other except for whether an electric conductive pattern is present, there is a difference in sheet resistance by a difference in contact level.

TABLE 1

| Evaluation | Ohmic resistance |
|---|---|
| Comparative Example | 3.5 Ωm |
| Example | 2.5 Ωm |

EXPERIMENTAL EXAMPLE 2

Figure 11:
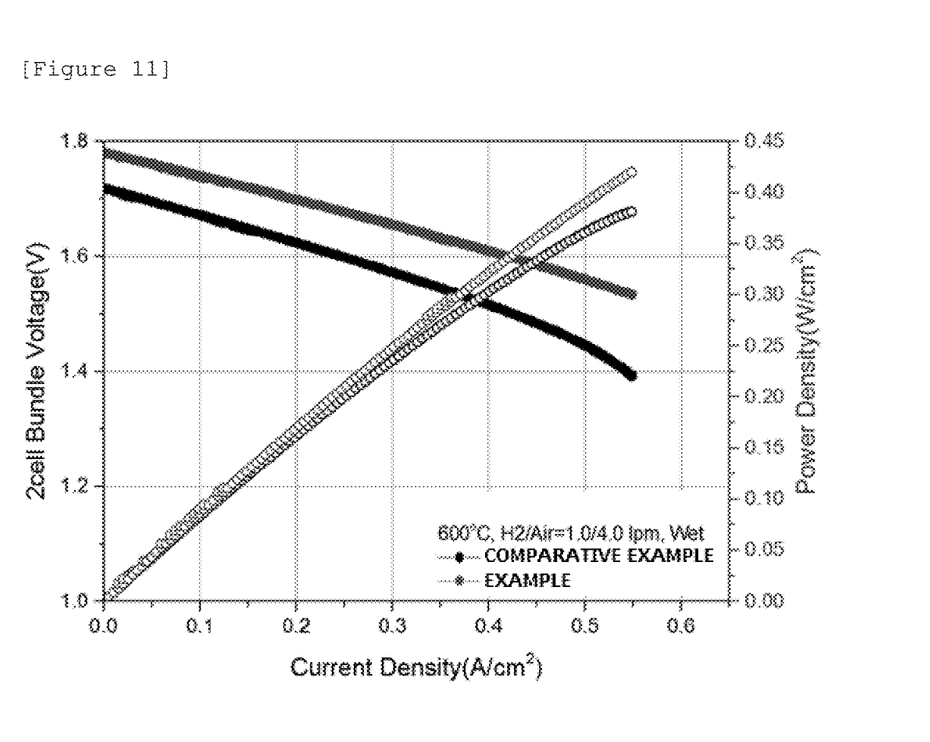
FIG. 11 is an I-V-P graph in an Example and a Comparative Example.

The performance of the batteries of the Example and the Comparative Example was measured using a current sweep as a potentiostat by flowing air of 2000 cc per a cell of the fuel cell to the cathode and flowing 500 cc of hydrogen to the anode at 600° C., and the results were illustrated in Table 2 and FIG. 11. FIG. 11 is an I-V-P curve generally illustrating performance of a fuel cell.

TABLE 2

| | OCV (V) | OPD (mW @ 0.5 A) |
|---|---|---|
| Comparative Example | 1.719 | 361 |
| Example | 1.781 | 389 |

* OCV(Open-circuit voltage): Open circuit voltage
* OPD: Operation Power density (0.5 A, 600° C.)

The invention claimed is:

1. A solid oxide fuel cell, comprising:
a battery cell including a cathode, an anode, and an electrolyte layer provided between the cathode and the anode, the cathode having a first surface facing the electrolyte layer and a second surface opposite the first surface of the cathode, the anode having a first surface facing the electrolyte layer and a second surface opposite the first surface of the anode;
a first separator positioned on the second surface of the cathode and provided with a flow channel pattern having a groove pattern and a protrusion pattern, to which air is supplied;
a second separator positioned on the second surface of the anode and provided with a flow channel pattern having a groove pattern and a protrusion pattern, to which fuel is supplied;
an electric conductive pattern provided on the second surface of the anode and facing the second separator along the groove pattern of the second separator, wherein the electric conductive pattern is inserted into the groove pattern of the second separator; and
an additional electric conductive pattern formed on the second surface of the cathode and facing the first separator along the protrusion pattern of the first separator,
wherein the additional electric conductive pattern is in contact with an end of the protrusion pattern of the first separator.

2. The solid oxide fuel cell of claim 1, further comprising:
an anode current collector provided between the anode and the second separator,
wherein the electric conductive pattern is formed on a surface of the anode current collector facing the second separator.

3. The solid oxide fuel cell of claim 1, wherein an average line width of the groove pattern of the second separator is equal to or smaller than an average line width of the electric conductive pattern.

4. The solid oxide fuel cell of claim 1, wherein a porosity of the electric conductive pattern is 30% or more.

5. The solid oxide fuel cell of claim 1, wherein an average height of the electric conductive pattern is equal to or smaller than a half of an average height of the groove pattern of the second separator.

6. The solid oxide fuel cell of claim 1, wherein an electric conductivity of the electric conductive pattern is 400 S/cm or more.

7. The solid oxide fuel cell of claim 1, wherein the electric conductive pattern includes nickel or nickel oxide.

8. The solid oxide fuel cell of claim 1, further comprising:
a cathode current collector provided between the cathode and the first separator.

9. A solid oxide fuel cell, comprising:
a battery cell including a cathode, an anode, and an electrolyte layer provided between the cathode and the anode, the cathode having a first surface facing the electrolyte layer and a second surface opposite the first surface of the cathode, the anode having a first surface facing the electrolyte layer and a second surface opposite the first surface of the anode;
a first separator positioned on the second surface of the cathode and provided with a flow channel pattern having a groove pattern and a protrusion pattern, to which air is supplied;
a second separator positioned on the second surface of the anode and provided with a flow channel pattern having a groove pattern and a protrusion pattern, to which fuel is supplied;
an electric conductive pattern provided on the second surface of the anode and facing the second separator along the groove pattern of the second separator, wherein the electric conductive pattern is inserted into the groove pattern of the second separator; and
an additional electric conductive pattern formed on the second surface of the cathode and facing the first separator along the groove pattern of the first separator,
wherein the additional electric conductive pattern is inserted into the groove pattern of the first separator.

10. A battery module including the solid oxide fuel cell of claim 1 as a unit cell.

* * * * *